(12) United States Patent
Champion et al.

(10) Patent No.: US 7,167,435 B2
(45) Date of Patent: Jan. 23, 2007

(54) STORAGE DEVICE HAVING A PROBE WITH PLURAL TIPS

(75) Inventors: Corbin L. Champion, Pullman, WA (US); Sarah M. Brandenberger, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 555 days.

(21) Appl. No.: 10/796,730

(22) Filed: Mar. 9, 2004

(65) Prior Publication Data

US 2005/0201257 A1 Sep. 15, 2005

(51) Int. Cl.
*G11B 7/00* (2006.01)

(52) U.S. Cl. ...................................... 369/126

(58) Field of Classification Search ............... 369/100, 369/126, 44.12, 44.26, 44.37
See application file for complete search history.

(56) References Cited

U.S. PATENT DOCUMENTS

| | | | |
|---|---|---|---|
| 4,489,278 A | * | 12/1984 | Sawazaki .................... 324/457 |
| 5,345,815 A | | 9/1994 | Albrecht et al. |
| 5,835,477 A | | 11/1998 | Binnig et al. |
| 5,856,967 A | | 1/1999 | Mamin et al. |
| 6,233,206 B1 | | 5/2001 | Hamann et al. |
| 6,370,107 B1 | | 4/2002 | Hosaka et al. |
| 6,473,361 B1 | | 10/2002 | Chen et al. |

OTHER PUBLICATIONS

Vettiger and Binnig, Scientific American, "The Nanodrive Project," pp. 47-51, 53 (Jan. 2003).
Todd C. Adelmann, U.S. Appl. No. 10/619,199, entitled Storage Device Having a Probe with Plural Tips, filed Jul. 14, 2003.

* cited by examiner

*Primary Examiner*—Nabil Hindi

(57) ABSTRACT

A storage device includes a probe having plural tips, and a storage medium having a surface. At least a first one of the tips is adapted to form a dent in the storage medium, and at least a second one of the tips is adapted to be electrically contact the surface of the storage medium in response to the first tip being engaged in the dent. The second tip is electrically isolated from the storage medium in response to the first tip being engaged on the surface of the storage medium and not being engaged in the dent.

26 Claims, 4 Drawing Sheets

STORAGE DEVICE HAVING A PROBE WITH PLURAL TIPS

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0." Other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing the tunneling effects to move and remove atoms or charge to or from the medium, or storing/removing charge from a particular region.

Traditionally, for a probe to read data bits from a storage medium in which dents have been formed, the probe is heated to a predetermined temperature, such as 400° C. When a scanning tip of the probe encounters and enters a dent, the tip transfers heat to the storage medium, which causes the temperature of the probe tip to fall, which in turn causes electrical resistance of the tip to fall. The fall in resistance, which is a relatively tiny amount, is detected by detection circuitry to determine the state of the data bit. Another technique for detecting the state of a data bit involves the use of a piezoresistive element in the probe. When the probe tip encounters a dent, the cantilever of the probe deflects, which causes the resistance of the piezoresistive element to change. The change in resistance is measured by detection circuitry. However, with the above techniques, the variation in resistance due to the presence and absence of a dent is relatively small. As a result, reliable detection of data bits may not always be possible due to the presence of noise and other factors. Also, the speed at which read operations can be performed is also reduced due to weak read signals in such probe-based storage devices.

DETAILED DESCRIPTION

Figure 1:
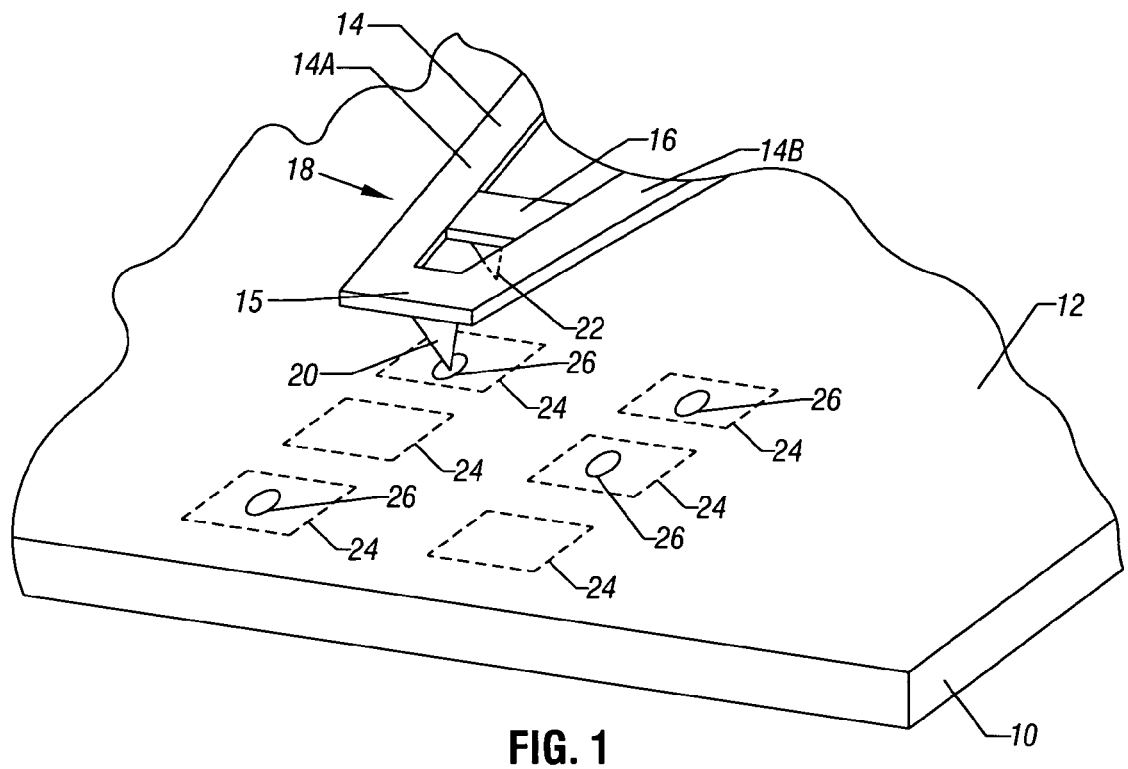
FIG. 1 illustrates a portion of a probe-based storage device that includes a storage substrate defining a storage medium, along with a probe having multiple tips according to an embodiment for reading data from the storage medium in which dents can be formed to represent data bits.

FIG. 1 shows an example probe-based storage device that includes a storage substrate 10 that provides a storage medium. As used here, the term "storage medium" refers to any medium in which storage cells are capable of being formed. The storage medium can make up a portion of the storage substrate 10, or the storage medium can be considered to be the whole storage substrate 10.

The storage medium has a storage surface 12 on which perturbations can be formed by a main tip 20 of a probe 18. The main tip 20 of the probe 18 is attached to and extends outwardly from a cantilever 14 of the probe 18. According to some embodiments, the probe 18 is a very small probe (on the order of micrometers, nanometers, or even smaller) that is built using nanotechnology techniques. Such a probe is referred to as a microscopic probe or a nanotechnology probe.

In the implementation depicted in FIG. 1, the cantilever 14 has two sections 14A and 14B that join at an end portion 15. The main tip 20 protrudes from the end portion 15 of the cantilever 14. The probe 18 also includes a cross member 16 that is connected between the sections 14A and 14B of the cantilever 14 at a position that is a lateral distance behind the end portion 15. A second tip 22 protrudes outwardly from the cross member 16. Thus, the probe 18 includes two tips, the main tip 20 and the second tip 22. Each tip 20 and 22 protrudes generally in a direction that is perpendicular to a plane in which the sections 14A, 14B, end portion 15, and cross member 16 generally lie. The second tip 22 is a tip that is shorter in length than the main tip 20. The main tip 20 is used for writing data to the storage medium and erasing data bits from the storage medium. The second, shorter tip 22 is used for reading data from the storage medium.

The second tip 22 is formed of an electrically conductive material, such as a metal, doped silicon, polysilicon, or other electrically conductive material. At least a portion of the main tip 20 is formed of an electrically insulating material. However, the material forming the main tip 20 is thermally conductive to enable heating of the tip 20 during write or erase operations. At least a layer (a layer that is closest to the storage surface 12) of the storage substrate 10 is also formed of an electrically conductive material. The layer is configured to conduct electricity as well as to be soft enough to react to heating of the main tip 20 of the probe 18 for forming dents in the layer. An example material that can be used to form the electrically conductive and soft layer is polymer (e.g., PMMA or polymethylmethacrylate) doped with electrically conductive elements. Other materials can be used in other embodiments.

In alternative embodiments, instead of having plural sections 14A, 14B, the cantilever 14 can be a single-piece cantilever. Also, the second tip 22 can have a different position on the cantilever 14 with respect to the main tip 20 (e.g., the second tip 22 is in front of the main tip 20, or the second tip 22 is on a side of the main tip 20). Detection for presence of a dent is possible as long as the second tip 22 is able to make electrical contact with the storage surface 12 in response to the main tip 20 engaging a dent 26.

FIG. 1 also shows an array of storage cells 24. Note that a large number of storage cells 24 are provided in the storage substrate 10, with six such storage cells 24 shown in FIG. 1 for purposes of illustration. In each storage cell 24, the main tip 20 can cause formation of a dent 26, which is basically a pit or hole that is formed into the storage surface 12. In the example shown in FIG. 1, four of the storage cells 24 contain dents 26 formed by the main tip 20 of the probe 18, while two of the storage cells 24 do not have the dents 26. Absence of a dent 26 represents a first logical state, while presence of the dent 26 represents a second storage state. Thus, for example, the presence of the dent 26 represents a logical "1," while the absence of the dent represents a logical "0."

To write to the storage medium, the probe 18 is scanned across the surface 12 of the storage substrate 10, with the main tip 20 heated and contacted to corresponding positions on the storage medium to form corresponding dents 26. To read from the storage medium, the probe 18 is also scanned across the storage medium. Detection of whether a dent 26 is present or not in a storage cell is based on whether the electrically conductive second tip 22 is in contact with the storage surface 12 (which is electrically conductive). If a dent 26 is present, the main tip 20 falls into the dent 26, which causes the second, shorter tip 22 to make electrical contact with the surface 12 of the storage substrate 10. This contact enables electrical communication between the second tip 22 and the storage surface 12. On the other hand, in a storage cell 24 in which a dent 26 is not present, the main tip 20 remains engaged with the storage surface 12 and thus the second, shorter tip 22 does not make contact with the storage surface 12 (the second tip 22 is electrically isolated from the storage surface 12). Consequently, in the latter case, no electrical communication occurs between the second tip 22 and the storage surface 12.

By employing the structure according to some embodiments of the invention, a relatively strong signal difference exists between a first measured signal where a dent is present in a storage cell 24 and a second measured signal where a dent is not present in a storage cell 24. The presence of a dent is indicated by electrical communication between the storage medium and the second tip 22, while the absence of a dent is indicated by no electrical communication between the storage medium and the second tip 22. This relatively large difference in measured signals allows for more reliable detection of data bits on the storage medium. Also, faster reading speeds can be achieved because of the more reliable reading capability.

To create a dent 26, the main tip 20 is locally heated to a predetermined temperature (e.g., up to about 400° C. or even greater) for some amount of time. The heat from the main tip 20 melts the storage surface 12 at the contact point of the main tip 20. When a downward force is applied onto the probe 18, the main tip 20 imprints the dent 26. The applied downward force can be an incremental, applied downward force, or alternatively, a constant downward force due to the elastic nature of the cantilever 14. For example, the storage device can be assembled such that the cantilever 14 is bent back a little and thus applies constant force on the storage surface 12.

Once a dent is formed, the dent can be erased by also using the main tip 20. During erase, the main tip 20 engages the dent 26, with the main tip 20 being heated locally to melt the material surrounding the dent 26 such that the material flows into the dent 26 to remove the dent. Alternatively, instead of using the main tip 20 to erase a dent, a local heat source can be provided underneath the storage medium in the storage substrate 10, with the heat source heated to melt the material surrounding the dent to reflow material back into the dent. Examples of such local heat sources include resistors or other heating elements.

Figure 2:
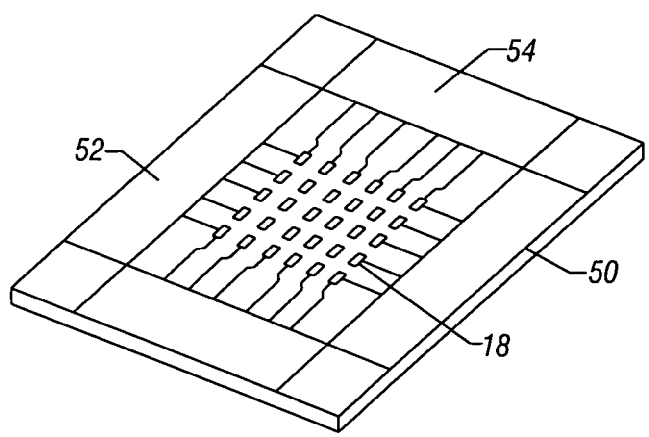
FIG. 2 is a schematic diagram of a probe substrate containing an array of probes and peripheral circuitry to interact with such probes.

Although FIG. 1 depicts one probe 18, it is contemplated that other embodiments can employ multiple probes 18 to further enhance bandwidth in writing and reading data bits on the storage medium. FIG. 2 illustrates a probe substrate 50 that includes an array of probes 18 formed in the probe substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 18 may be activated by the select lines to read from or write to storage cells that the probes are in contact with. This structure enables concurrent access of multiple cells in one operation, which improves access speeds. Alternatively, one of the probes may be activated to read from or write to a storage cell. The peripheral circuitry 52 and 54 also include sensing devices and decoders to detect analog signals from the probes during a read operation. The sensing devices and decoders convert the analog signals to a digital representation of a logical "0" or a logical "1." Also, during a write operation, the peripheral circuitry causes heating of selected probe(s) 18 to imprint dents in selected storage cells.

Figure 3:
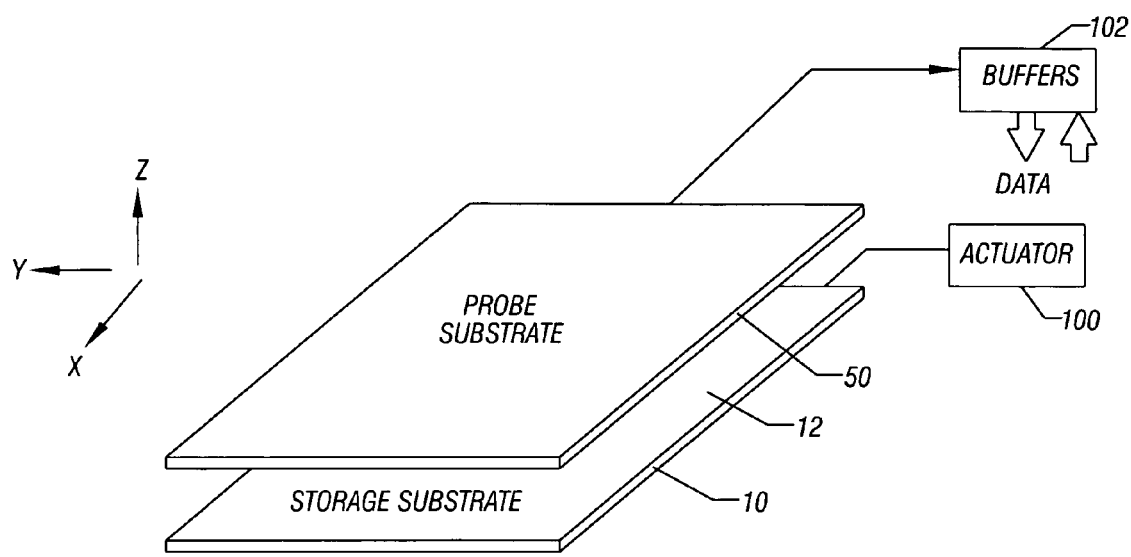
FIG. 3 illustrates the probe substrate positioned to face the storage substrate in the probe-based storage device of FIG. 1.

As shown in FIGS. 1 and 3, the probe substrate 50 is placed with the surface containing the probes 18 facing the storage surface 12 of the storage substrate 10, on which the storage cells are formed. The probe substrate 50 is positioned over the storage substrate 10 so that the probe tips 20 and 22 (FIG. 1) of each probe 18 point downwardly to engage the storage surface 20 of the storage substrate 10. In an alternative arrangement, the storage substrate 10 is positioned over the probe substrate 50 so that the probe tips 20 and 22 point upwardly to face the storage surface 12. In other arrangements, the probe substrate 50 and the storage substrate 10 can have a lateral or diagonal relationship.

The storage substrate 10, in the example of FIG. 3, is coupled to an actuator 100 that is designed to move the storage substrate 10 in both X and Y directions such that probes 18 (FIG. 1) can be placed over desired storage cells on the storage substrate 10. Data sensed by the probes 18 is provided to buffers 102, which store output data for retrieval by an external device. The buffers 102 may also store write data to be written to storage cells 24 (FIG. 1) in the storage substrate 10.

Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 4:
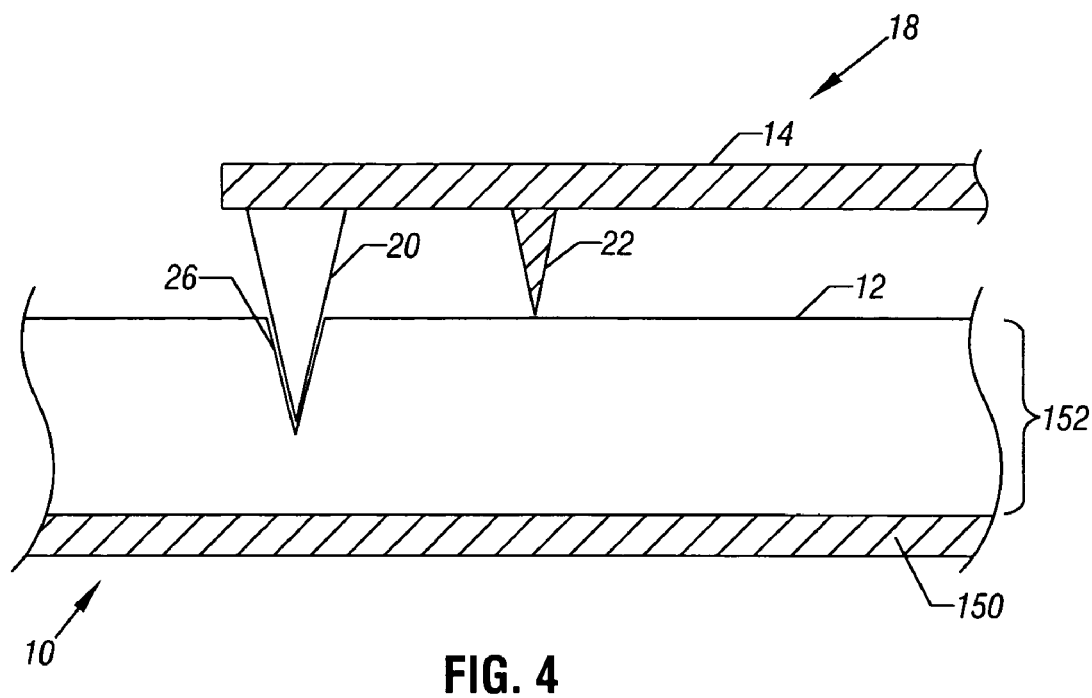
FIG. 4 is a cross-sectional view of the probe and storage medium of FIG. 1, where a main tip of the probe is engaged in a dent formed in the storage medium.

FIG. 4 shows a cross-sectional diagram of a portion of the probe 18 and the substrate 10 where the main tip 20 of the probe 18 has dropped into a dent 26. As shown in FIG. 4, because the main tip 20 has dropped into the dent 26, the second, shorter tip 22 drops by a sufficient distance to engage the storage surface 12. A layer 152 adjacent the storage surface 12 is an electrically conductive layer. In addition, an electrical conductor 150 is provided below the electrically conductive layer 152. The layer 152 is formed of a soft and electrically conductive material that enables formation of the dent 26. The electrical conductor 152 is formed of a metal, polysilicon, doped silicon, or other electrically conductive material. The electrical conductor 150 can be in the form of a wire trace.

In response to the second tip 22 being engaged in the storage surface 12, as depicted in FIG. 4, electrical communication is achieved between the second tip 22 and the layer 152 and electrical conductor 150. Several techniques can be used to detect for electrical communication of the second tip 22 and the storage surface 12. In a first technique, a current source (which can be provided in the peripheral circuitry 52 or 54 of FIG. 2) is capable of driving a predetermined electrical current through the cantilever 14 (also formed of an electrically conductive material) and the second tip 22 into the layer 152 once contact is made between the second tip 22 and the storage surface 12. The electrical current is returned by the electrical conductor 150. The presence of the predetermined electrical current through the cantilever 14 (or through the electrical conductor 150) is an indication that a dent 26 has been encountered by the probe 18. The current is detected by a current sensor in the peripheral circuitry 52 or 54 (FIG. 2).

In a second technique, a voltage is provided at the cantilever 14 and second tip 22, and a voltage sensor in the peripheral circuitry (52 or 54 in FIG. 2) detects whether a voltage is induced in the electrical conductor 150. When the second tip 22 makes contact with the storage surface 12, and a voltage is applied at the cantilever 14, electrical conductance between the second tip 22 through the electrically conductive layer 152 enables the electrical conductor 150 to be driven to the same voltage (or substantially the same voltage) as that of the cantilever 14.

In a third technique, a voltage difference can be induced between the cantilever 14 and the electrical conductor 150. Such a voltage difference is possible due to the resistance associated with the layer 152. When a voltage difference is generated across the cantilever 14 and the electrical conductor 150, a current is induced through the cantilever 14, second tip 22, layer 152, and the conductor 150. This current is detected by a current sensor in the peripheral circuitry 52 or 54 (FIG. 2).

Detection of an electrical voltage or current enables the peripheral circuitry to indicate a first data state associated with presence of a dent in a storage cell. If the peripheral circuitry does not detect current, then the peripheral circuitry indicates a second data state associated with absence of a dent in a storage cell.

If plural probes 18 are present in the storage device, then plural current or voltage sensors in the peripheral circuitry 52 or 54 (FIG. 2) are associated with respective probes 18 to detect for a current or voltage to determine whether or not dents are present in respective storage cells.

Note that the electrical conductor 150 underneath the layer 152 can be omitted in some embodiments. In such embodiments, contact by the second tip 22 with the storage surface 12 enables current to flow from the cantilever 14 generally into the storage substrate 10. Such a current can be detected by peripheral circuitry.

Figure 5:
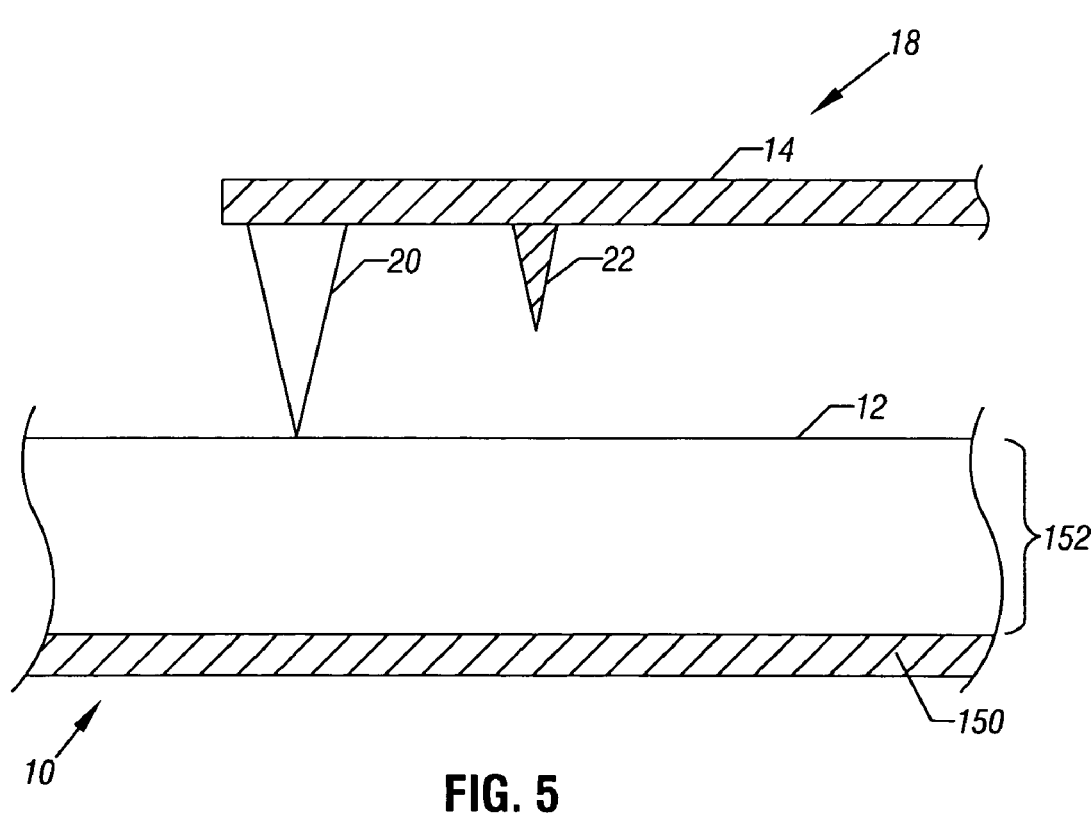
FIG. 5 is a cross-sectional view of the probe and storage medium of FIG. 1, where the main tip of the probe is engaged on a surface of the storage medium but not in a dent.

FIG. 5 shows a position of the probe 18 relative to the storage medium where the main tip 20 is located at a storage cell in which no dent 26 has been formed. In this case, the second tip 22 is spaced apart some distance from the storage surface 12, which prevents electrical communication between the second tip 22 and the storage substrate 10. In this case, no current or voltage is detected, which indicates the absence of a dent.

Figure 7:
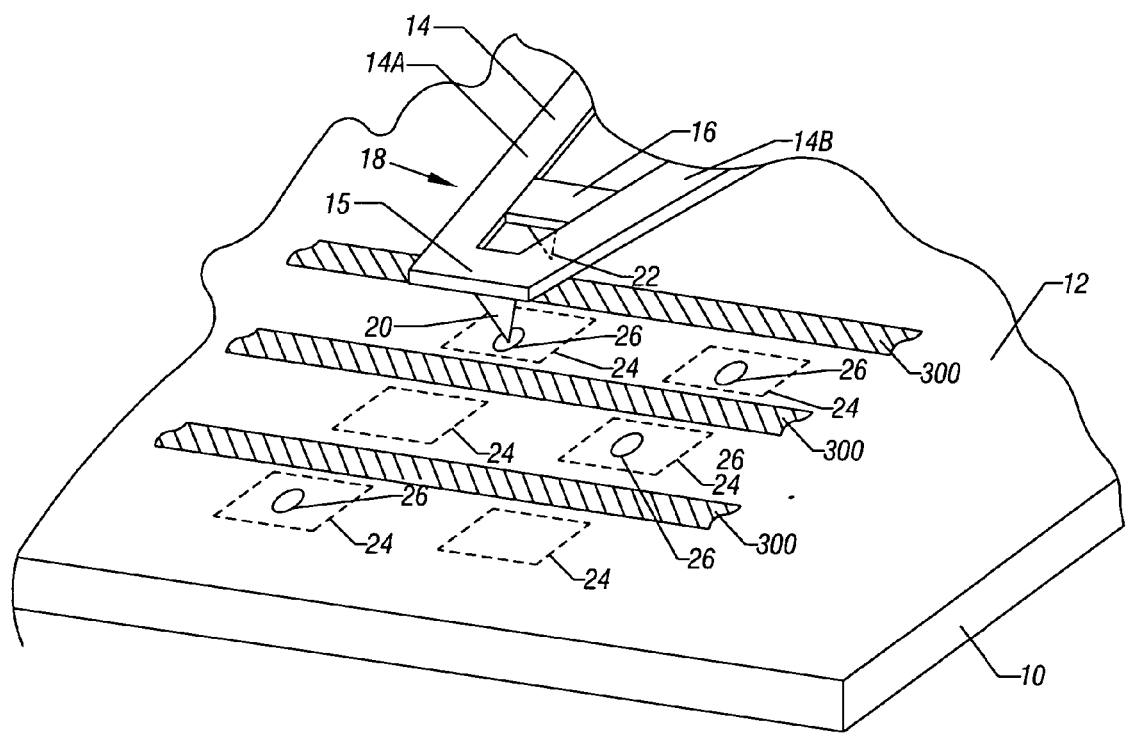
FIG. 7 illustrates a probe-based storage device according to another embodiment.

In an alternative embodiment, as depicted in FIG. 7, electrically conductive traces 300 are provided on the storage surface 12 for electrically contacting the second tip 22 of a probe 18 in response to the main tip 20 engaging a dent 26. Each electrically conductive trace 300 is provided in a gap between respective storage cells 24.

By employing the electrically conductive traces 300, the storage substrate 10 does not have to be formed of an electrically conductive material. When a trace 300 is electrically contacted to the second tip 22, electrical communication is achieved between the probe 18 and the trace 300. The trace 300 can be connected to the peripheral circuitry 52 or 54 (FIG. 2) to enable detection of an electrical signal (voltage or current) in response to engagement of the main tip 20 with a dent 26.

Figure 6:
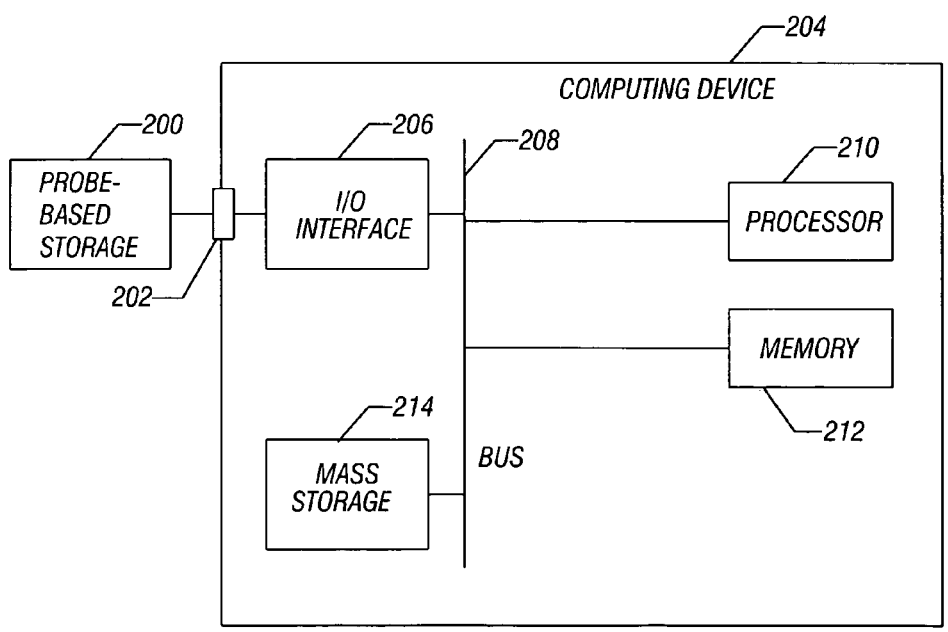
FIG. 6 is a block diagram of a system that includes a computing device having a port to connect to a probe-based storage device.

The probe-based storage device can be packaged for use in a computing system. For example, as shown in FIG. 6, a probe-based storage device 200 that incorporates the multi-tip probe(s) 18 according to some embodiments is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:

a probe having plural tips; and a storage medium having a surface, wherein at least a first tip of the probe is adapted to form a dent in the storage medium, wherein at least a second tip is adapted to electrically contact the surface of the storage medium in response to the first tip being engaged in the dent, and wherein the second tip is electrically isolated from the storage medium in response to the first tip being engaged on the surface of the storage medium and not being engaged in the dent.

2. The storage device of claim 1, wherein the second tip has a shorter length than the first tip.

3. The storage device of claim 2, wherein the second tip is electrically conductive, and wherein at least a portion of the first tip is electrically insulating.

4. The storage device of claim 1, further comprising a second probe having plural tips,
wherein at least a first tip of the second probe is adapted to form a second dent in the storage medium,
wherein at least a second tip of the second probe is adapted to electrically contact the storage medium in response to the first tip of the second probe being engaged in the second dent, and
wherein the second tip of the second probe is electrically isolated from the storage medium in response to the first tip of the second probe engaged on the surface of the storage medium and not being engaged in the second dent.

5. The storage device of claim 4, wherein the probes are adapted to form the dents in one or more write operations.

6. The storage device of claim 5, further comprising circuitry to detect data states during one or more read operations based on whether the second tips of the respective probes are electrically contacted to or electrically isolated from the surface of the storage medium.

7. The storage device of claim 1, wherein the storage medium comprises an electrically conductive layer adjacent the surface, the dent being formed in the electrically conductive layer.

8. The storage device of claim 7, further comprising an electrical conductor,
the second tip to electrically communicate with the electrical conductor through the electrically conductive layer in response to the second tip being electrically contacted to the surface of the storage medium.

9. The storage device of claim 1, wherein the first tip is heatable to a temperature to melt a portion of the storage medium to form the dent.

10. The storage device of claim 9, wherein the first tip forms the dent during a write operation.

11. The storage device of claim 10, wherein the storage medium contains storage cells, the storage device further comprising circuitry to detect for presence of the dent in a first one of the storage cells to determine a state of data stored in the first storage cell.

12. The storage device of claim 11, wherein the probe and the storage medium are movable with respect to each other to enable the probe to write to and read from the storage cells.

13. A system comprising:
a processor; and
a storage device comprising:
a storage medium; and
a probe having a first tip adapted to form dents in the storage medium, and a second tip adapted to detect for dents in the storage medium,
wherein the first and second tips have different lengths.

14. The system of claim 13, wherein the first tip is adapted to form the dents during a write operation, and wherein the second tip is adapted to detect for presence of the dents during a read operation.

15. The system of claim 14, wherein the first tip has at least a portion formed of an insulating material, the second tip is formed of an electrically conductive material, and the storage medium has a layer formed of an electrically conductive material,
wherein the second tip is adapted to electrically contact the layer in response to the first tip being engaged in a dent.

16. The system of claim 14, wherein the storage device further comprises circuitry to detect for at least one of a current or voltage in response to the second tip being in electrical contact with the layer.

17. A method of storing data, comprising:
during a write operation, forming a dent in a storage medium with a probe having at least a first tip and a second tip;
during a read operation, indicating a first data state in response to detecting that the second tip is electrically contacted to a surface of the storage medium due to the first tip being engaged in the dent; and
during the read operation, indicating a second data state in response to detecting that the second tip is spaced apart from the surface of the storage medium due to the first tip not being engaged in the dent.

18. The method of claim 17, further comprising heating the first tip to a temperature to melt a portion of the storage medium to form the dent during the write operation.

19. The method of claim 17, further comprising detecting at least one of a voltage and current based on whether or not the second tip is electrically contacted to the surface of the storage medium.

20. The method of claim 19, wherein the storage medium has a layer that is electrically conductive, the method further comprising establishing electrical communication between the second tip and the layer in response to the second tip being electrically contacted to the surface of the storage medium.

21. The method of claim 17, wherein the storage medium has plural storage cells, wherein forming the dent comprises forming the dent in a first one of the storage cells, the dent in the first storage cell representing a first data state, the method further comprising:
during the write operations, not forming a dent in a second one of the storage cells, wherein absence of the dent in the second storage cell represents a second data state.

22. The method of claim 21, further comprising the first tip engaging the dent in the first storage cell in response to the probe being positioned at the first storage cell,
whether the second tip electrically contacts the surface of the storage medium in response to the first tip being engaged in the dent of the first storage cell.

23. The method of claim 22, further comprising positioning the probe at the second storage cell,
wherein the first tip remains engaged on the surface of the storage medium with the probe at the second storage cell, and
wherein the second tip is spaced apart from the surface of the storage medium in response to the first tip remaining engaged on the surface of the storage medium.

24. A storage device comprising:
a probe having plural tips;
a storage medium having a surface; and
an electrically conductive trace on the surface,
wherein at least a first one of the tips of the probe is adapted to form a dent in the storage medium,
wherein at least a second one of the tips is adapted to electrically contact the electrically conductive trace in response to the first tip being engaged in the dent, and wherein the second tip is electrically isolated from the electrically conductive trace in response to the first tip being engaged on the surface of the storage medium and not being engaged in the dent.

25. The storage device of claim 24, wherein the second tip has a shorter length than the first tip.

26. The storage device of claim 24, wherein the storage medium comprises plural storage cells, the storage device further comprising additional electrically conductive traces for electrical engagement with the at least second tip of the probe, wherein each electrically conductive trace is provided in a gap between corresponding storage cells.

* * * * *